United States Patent [19]
Frenkel

[11] 3,937,939
[45] Feb. 10, 1976

[54] SINGLE-HAND DIGITAL CALCULATOR

[76] Inventor: Marvin A. Frenkel, 26323 Hendrie Blvd., Huntington Woods, Mich. 48070

[22] Filed: Jan. 7, 1974

[21] Appl. No.: 431,499

[52] U.S. Cl............................... 235/156; 235/145 R
[51] Int. Cl.²........................................... G06F 7/38
[58] Field of Search............ 235/156, 145 R, 145 A, 235/146

[56] References Cited
UNITED STATES PATENTS 3,034,717  5/1962  Werner................................. 235/146
3,800,129  3/1974  Vmstattd ............................. 235/156

Primary Examiner—David H. Malzahn
Attorney, Agent, or Firm—Lawrence E. Sklar, Esq.

[57] ABSTRACT

An electronic digital calculator, the calculator being in the form of an elongated tubular body having a size and shape similar to a pen or pencil and having a plurality of input valve setting keys and function keys carried on its surface as well as illuminable "read-out", or display, screen. The value setting keys and the function keys are arranged on the surface of the tubular body such that the calculator can be used while held in one hand of the user.

15 Claims, 3 Drawing Figures

U.S. Patent  Feb. 10, 1976  3,937,939
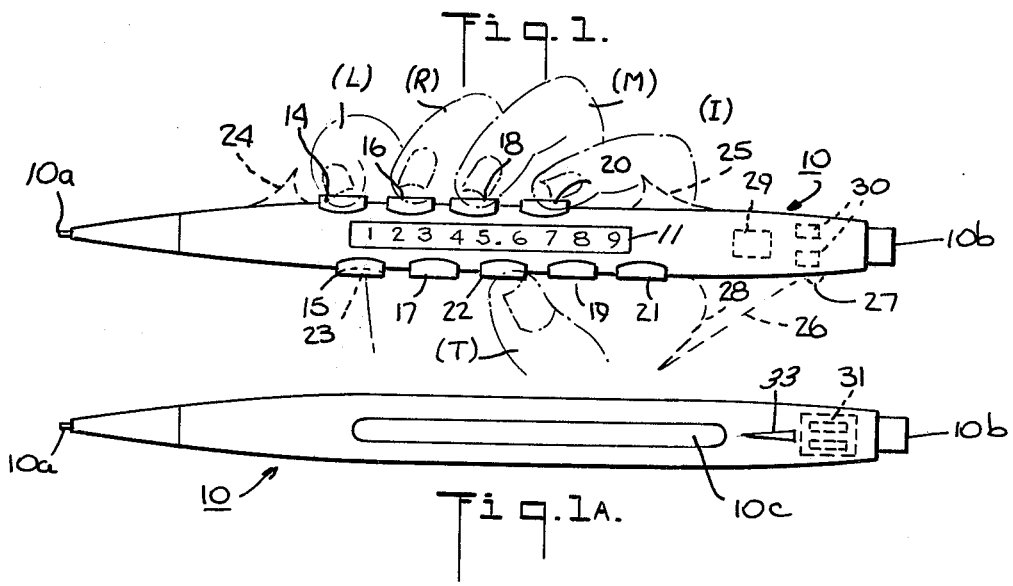
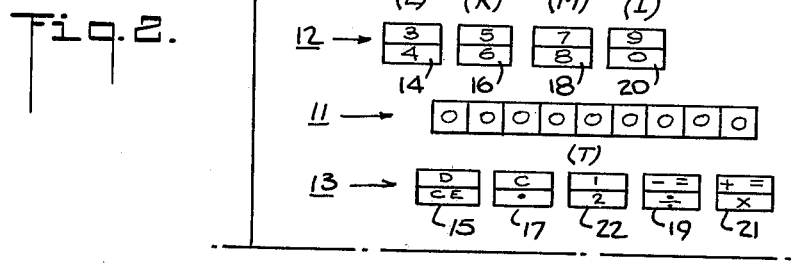
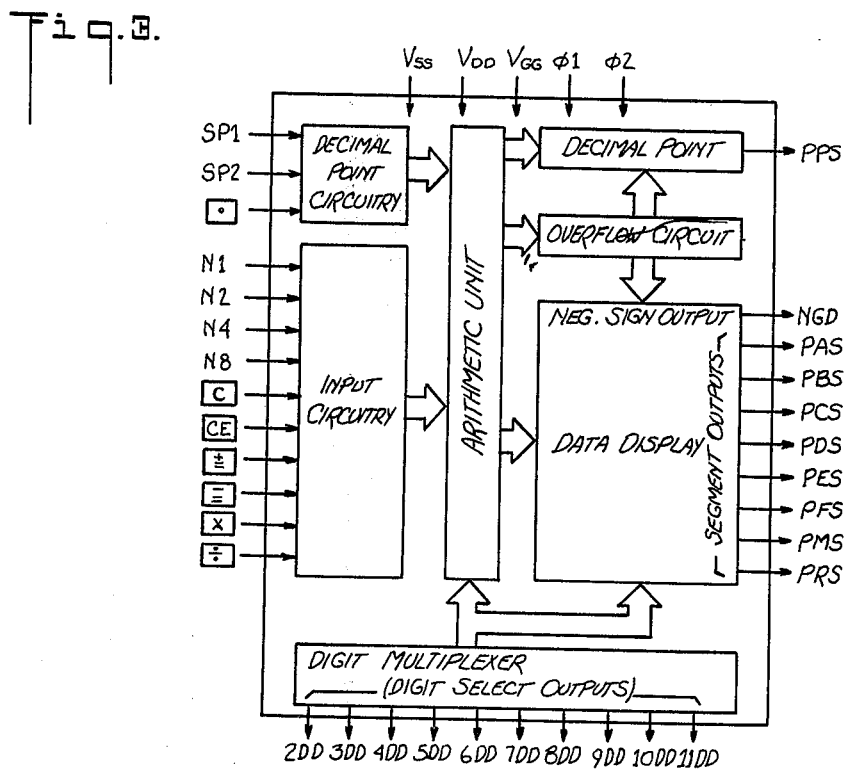

SINGLE-HAND DIGITAL CALCULATOR

This invention relates to an electronic digital calculator having a size and shape similar to a pen or pencil and containing a "read-out" or display screen, input value setting keys, and function keys which are arranged on the calculator so that it can be operated while held in one hand of the user.

BACKGROUND OF THE INVENTION

The use of electronic digital calculators of reduced size have recently received widespread acceptance and such calculators are becoming increasingly popular as they are compact, lightweight, and can be carried in a briefcase or in the pocket of a user. Exemplary of one such compact digital calculator is a portable microelectronic calculator manufactured by Bowmar/Ali, Inc. and being Model No. 901 B.

While these pocket-size calculators have met with some success, they are not completely satisfactory. Although relatively lightweight and compact, they are generally still too bulky and too heavy to be comfortably carried in a user's jacket pocket for ready accessibility. Therefore, most such calculators are carried in a briefcase and are not as conveniently accessible as many users would like them to be.

In addition, and more importantly, these compact calculators must either be placed on a firm surface or held in one hand by the user while he operates it with his other hand. Thus, a user must either be near a table, desk, or other convenient surface, or must hold the calculator in one hand and operate it with the other hand, in which instance the operator is not free to refer to data or other information as he must interrupt his calculations and place the calculator down before referring to such data or information.

It would be desirable, therefore, to provide a calculator which is of a size, shape and weight that enables it to be easily and comfortably carried in the pocket of a user for ready accessability, and which can be operated while held in one hand of the user, thereby leaving the other hand of the user free to refer to notes, data, and the like, while operating the calculator.

THE INVENTION

These desirable ends have now been attained by the electronic digital calculator of the invention which is of a size, shape and weight that enable it to be comfortably and conveniently carried in a jacket pocket of a user and which is manufactured in such a way that it can be operated while held in only one hand of the user. Generally, the calculator of the invention comprises an elongated cylindrical, tubular boy having a plurality of input value setting keys and a plurality of function keys carried on the outer surface of the tubular body; an illuminable display "read-out" screen; an electronic chip housed within the tubular body electrically connected to the value and function keys and the read-out screen; and, batteries housed within the tubular body providing a source of electrical power to the electronic chip, the arrangement of the value setting keys and function keys being such that the calculator can be operated while held in only one hand of the user.

The calculator carries a sufficient number of value keys to enable digital input from 0 to 9 and also carries a sufficient number of function keys to enable such operations as addition, subtraction, multiplication, division, decimal point placement, clearing, correcting error, and the like, to be readily and easily performed. In alternate embodiments, the tubular body can be equipped with writing means, such as pencil lead and eraser, ball point pen tip, and the like, and can also be equipped with support means for the user's fingers during manipulation of the keys of the calculator.

The structural details and operational features of the calculator of the invention will become clear from the ensuing description thereof when taken together with the accompanying drawing wherein the several figures illustrate a preferred embodiment thereof, and wherein:

FIG. 1 is a side view of the electronic digital calculator of the invention showing the arrangement of the input value setting keys, the function keys, and the illuminable display read-out screen as seen when the calculator is held by the hand of an operator which is shown in dot-dash lines;

FIG. 1a is a view similar to FIG. 1 but showing the calculator as it would be seen if rotated 180° about its longitudinal axis;

FIG. 2 is a plan view of the input value setting keys, the read-out screen, and the function keys showing the relative positions of these components as they would appear if placed on a flat surface; and FIG. 3 is a schematic view illustrating a typical functional diagram of an electronic chip which can be used in the calculator of the invention.

As shown in FIGS. 1 and 2, the calculator of the invention generally comprises an elongated cylindrical tubular body 10 having an illuminable display "read-out" screen 11 disposed between a first row 12 and a second row 13 of manually operated keys. Tubular body 10 can be formed to be about the same size and shape as a pen or pencil and can be provided either with such writing means as pencil lead or a ball point tip 10a and a cap or eraser 10b, or without such writing means to merely house and carry the components of the calculator. In either embodiment, the read-out screen 11 and the first and second rows of keys 12 and 13 are circumferentially spaced from each other on the outer surface of the tubular body 10 so that they are parallel to each other and parallel to the longitudinal axis of the tubular body 10. The keys in each row 12 and 13 are mounted so that they protrude slightly above the surface of the tubular body 10 and are longitudinally spaced from each other so that when the calculator is held in the hand of an operator, these keys can be conveniently and easily contacted by and manipulated with the fingers on one hand of the operator as shown in dot-dash lines in FIG. 1.

Display or read-out screen 11 is mounted so that it is flush with or, preferably, slightly below the surface of tubular body 10 and can include means to illuminate it as well as protective means, such as placing a transparent plastic sheet (not shown) over it to form a window through which screen 11 can be viewed.

In FIG. 1, the calculator is shown held in the right hand of an operator with each of the operator's fingers in contact with an input value setting key. Hence, keys 14, 16, 18 and 20 in the first row of keys 12 are all input value setting keys as is key 22 in the second row of keys 13. As shown in FIG. 1, each of these keys is manually actuated by a finger of the operator; key 14 by the little finger (L), key 16 by the ring finger (R), key 18 by the middle finger (M), key 20 by the index finger (I), and key 22 by the thumb (T). Furthermore, each of these keys is capable of putting in two different digital values so that, collectively, they provide a ten digit keyboard. Thus, in the embodiment shown, key 14 is for input of digital "3" and 4, key 16 is for digits 5 and 6, key 18 is for digits 7 and 8, key 20 is for digits 9 and 0, and key 22 is for digits 1 and 2.

The remaining keys in the second row of keys 13 are all function keys and are all actuated by the thumb (T) of the operator. These keys consist of keys 15, 17, 19 and 21, each of which perform two functions which are designated in FIG. 2 by a letter or mathematical symbol. Thus, key 15 is for recall (D) and to correct error (CE), key 17 is for clear (C) and decimal point placement (.), key 19 is for subtraction (−) and division (÷) and key 21 is for addition (+) and multiplication (×). To facilitate manual actuation of the keys, their surface can be slightly depressed, as shown in dotted lines at 23 for key 15 in FIG. 1, for firmer contact of the keys by the operator's fingers.

Each of the keys is mounted to be movable to one of three positions: a neutral or off position, or to one of the two digit values on each key of the input value setting keys or to one of the two functions of the function keys as described immediately above. The keys can be mounted on the surface of the tubular body 10 so that they are actuated by sliding them to one of the two operable positions depending upon the digital value desired or the function to be performed. The two, sliding, actuating positions of each key can be either longitudinal of the tubular body 10 or arcuate along the circumferential surface of the tubular body 10. For example, longitudinal sliding from their off position of keys 14, 16, 18, 20 and 22 toward tip 10a of tubular body 10 to a first operable position will result in the input and setting of digital values 3, 5, 7, 9 and 1 respectively, while sliding these same keys longitudinally toward cap end 10b to a second operable position will result in the input and setting of digital values 4, 6, 8, 0 and 2, respectively. Similarly sliding keys, 15, 17, 19 and 21 from an off position toward tip 10a will result in the functions of recall, clear, subtraction and addition, respectively, while sliding these same keys to a second operable position toward cap 10b will result in the functions of correct error, decimal point placement, division, and multiplication, respectively.

As mentioned earlier, the value setting keys and the function keys can alternatively be mounted to be arcuately slid from an off position to one of two operable positions, such as toward or away from read-out screen 11, to input and set the digital values and perform the functions just described. In either embodiment, actuation of the input value setting keys and the function keys causes the performed calculation to digitally appear on the display read-out screen 11.

For ease of handling and manipulation of the various keys by the operator, the calculator can be equipped with suitable support means. For example lateral support for the little finger (L) and index finger (I) of the operator's hand can be provided in the form of wedge-shaped stops, as shown by dotted lines 24 and 25, while support for the operator's thumb (T) can be in the form of a pull-out clip, as shown in dotted lines at 26, the clip being pivoted to the tubular body 10 as at 27 and having a curved extension 28 against which the operator's thumb can be placed when the calculator is held for use. When not in use, the curved extension 28 can be recessed within the tubular body 10. A typical pen-type carrying clip 33 can be mounted to the tubular body 10 for carrying the calculator in a jacket pocket. In addition, the tubular body 10 can have a longitudinally flattened surface area as shown in 10c in FIG. 1a so that the calculator can be placed on a flat surface without rolling and still be operated with one hand.

Circuitry for the calculator of the invention can be provided by any one of a number of electronic semiconductor chips of the type and kind generally used for large scale integrated circuits (LSI) having a power consumption of about 20–30 mw. and which are known to those skilled in the art. For example, the circuitry described by the Mostek Corporation in connection with their MOS-10 digit portable microelectronic calculator Model No. MK5010P could also be used in the calculator of this invention. The power supply for the electronic chip can be provided by small batteries of the mercury cell type. Positioning of the electronic chip and batteries within the tubular body can be at any convenient point such as is shown in dotted lines at 29 for the electronic chip and at 30 for the batteries. A receptacle can also be included as shown in dotted lines at 31 in FIG. 1a for periodic recharging of batteries 30.

The schematic functional diagram shown in FIG. 3 is typical of those which are descriptive of the function of a miniaturized electronic chip, such as is used in the calculator of the invention. A typical function of such a miniaturized chip would be that of performing calculations, including addition, subtraction, multiplication and division, with resultant display of up to 10 digits and decimal point.

As shown in FIG. 3, a typical miniaturized chip uses simple, external binary encoding of numeric keys for inputs at $N_1$, $N_2$, $N_4$ and $N_8$. These inputs sense their logic state, and entry is made with logic 1 at any input. Previous entries are then shifted to the left and when all inputs are at logic 0, entry is complete.

The numeric entry, or the resulting calculation, is displayed on a scan or strobed basis. A Digit Select output enables the appropriately selected digit to be displayed. In the diagram of FIG. 3, 11DD corresponds to the Most Significant Digit (MSD) while 2DD corresponds to the Least Significant Digit (LSD). As outputs are scanned from LSD to MSD, the appropriate data for each selected digit appears at the segment outputs.

By inhibiting the appropriate Digit Select Outputs, leading zeros can be blanked and meaningless zeros to the left of the decimal point are not displayed. In this embodiment all digits are blanked during calculation time ($t_{cal}$).

The decimal point can be selected at inputs SP1 and SP2 to provide results in units (0 places); in hundredths (2 places); in thousandths (3 places); or ten-thousandths (4 places), and numeric entry can be carried as far as the selected decimal point placement. Any further entry past the selected decimal point placement would be disregarded.

Overflow can occur when a numeric entry exceeds 10 digits, or a resultant calculation exceeds 10 digits, when carried to the selected number of decimal places. When overflow does occur, the display becomes all 0's, with the decimal point output (PPS) in a static logic 1 condition so the displayed reading becomes all zeros.

The Clear Input provides a complete clearing of all entries and resultant calculations. Clear Entry provides clearing of all numeric entries following the last function command, but does not clear previous entries stored in the register that are awaiting calculation.

Completion of Clear or Clear Entry produces a numeric zero display.

The negative sign output, NGD, will assume a static logic 1 state when a negative number (number less than zero) is selected, and a logic 0 state when a positive number is selected.

The Decimal Point output, PPS, will assume a logic 1 state at the appropriate Digit Select time and a logic 0 state at all other times.

A summary of the function of a typical electronic chip with respect to the input value setting keys and function keys of the calculator would be as follows:

0 – 9 Numeric inputs. The decimal is entered to the right of the least significant digit. Once entered, further decimal depressions are disregarded.

C CE Clear and Clear Entry. See description above

X Stores multiplication command and the associated numeric entry. Can also be used to accomplish a preceding operation such as in chain calculations.

÷ Stores division command and the associated numeric entry. Can also be used to accomplish a preceding operation, such as in chain calculations.

= Stores the associated numeric entry as a negative number. Can also be used to accomplish a preceding operation, e.g., to gain the resultant in a substraction problem or to add negative numbers.

+= Stores the associated numeric entry as a positive number. Can also be used to accomplish a preceding operation.

The circuitry schematically shown in FIG. 3 is intended for use with displays having the decimal point physically located on the right side of the display elements so that calculations will be displayed to the selected number of decimal places and lesser significant digits will be truncated.

It will be apparent that the electronic circuitry described above can be modified to obtain other desired results. It will also be apparent that various structural changes can be made in the calculator of the invention such as different positioning of the keys and the display read-out screen. In addition, the value setting and function keys can be assigned other values so that a mathematical result rather than an arithmetical result is obtained. Such changes and modifications are all considered to be within the knowledge of the skilled artisan and can be accomplished with the calculator of the invention, without departing from the scope and spirit of the invention.

What is claimed is:

1. An electronic digital calculator comprising an elongated cylindrical tubular body; a plurality of input value setting keys mounted on and carried on the outer surface of said tubular body; a plurality of function keys mounted on and carried on the outer surface of said tubular body; a display readout screen mounted on said tubular body for visible scanning of the calculation being performed; an electronic chip housed within said tubular body and electrically connected to said value setting keys, said function keys, and said read-out screen; and, battery means housed within said tubular body for providing a source of electrical power to said electronic chip, said valve setting keys and said function keys being arranged on the outer surface of said tubular body such that they can be manually actuated by the fingers of one hand of a user while held in said hand.

2. The calculator of claim 1 wherein the tubular body comprises a size and shape similar to a pen.

3. The calculator of claim 1 wherein said tubular body includes a receptacle means for periodic recharging of said batteries.

4. The calculator of claim 1 wherein said tubular body has a longitudinally flattened surface for placement of said calculator on a flat surface.

5. The calculator of claim 4 wherein the tubular body comprises a size and shape similar to a pen.

6. The calculator of claim 1 wherein said value setting keys and said function keys are mounted on the outer surface of said tubular body in two rows of longitudinally spaced keys, each of said rows being circumferentially spaced from each other with said display read-out screen disposed therebetween, said two rows and said read-out screen being parallel to the longitudinal axis of said tubular body.

7. The calculator of claim 6 wherein said value setting keys and said function keys are slidably mounted on said tubular body such that said keys can be slidably actuated from an off position to one of two operable positions, each of said value setting keys being capable of inputting two different digital values, and each of said function keys being capable of performing two different functions when said value setting keys and said function keys are manually actuated by sliding them from their off positions to one of said two operable positions.

8. The calculator of claim 7 wherein said value setting keys and said function keys are mounted to be manually actuated by sliding them longitudinally of said tubular body to one of two operable positions.

9. The calculator of claim 7 wherein said value setting keys and said function keys are mounted to be manually actuated by sliding them arcuately of said tubular body to one of two operable positions.

10. The calculator of claim 9 wherein the tubular body comprises a size and shape similar to a pen.

11. The calculator of claim 6 wherein one of said rows of keys comprises four input value setting keys and the other of said rows of keys comprises one input value setting key and four function keys, said function keys and one of said value setting keys being spaced and arranged for manual actuation of the thumb of a user and the remainder of said value setting keys being spaced and arranged for manual actuation by the remaining four fingers on the same hand of the user.

12. The calculator of claim 11 wherein said value setting keys collectively comprise a digital keyboard capable of inputting digital values from 0–9, inclusive, and said function keys collectively comprise a function keyboard capable of performing the functions of recall, correct error, clear, decimal point placement, addition, subtraction, division and multiplication.

13. The calculator of claim 11 wherein support means are mounted on said tubular body adjacent the positions of the thumb, index finger, and little finger of the user when said calculator is held for use.

14. The calculator of claim 11 wherein said tubular body has mounted thereon clip means for securing said calculator to and carrying said calculator in the pocket of a user.

15. The calculator of claim 11 wherein said tubular body has housed therein writing means mounted such that said writing means can be mechanically and manually actuated.

* * * * *